US009775025B2

(12) United States Patent
Noldus et al.

(10) Patent No.: US 9,775,025 B2
(45) Date of Patent: Sep. 26, 2017

(54) LOCAL NUMBER FOR ROAMING SUBSCRIBER

(71) Applicant: Telefonaktiebolaget LM Ericsson (publ), Stockholm (SE)

(72) Inventors: Rogier August Caspar Joseph Noldus, Goirle (NL); Marcel Erkel, Rijen (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/106,517

(22) PCT Filed: Dec. 20, 2013

(86) PCT No.: PCT/EP2013/077733
§ 371 (c)(1),
(2) Date: Jun. 20, 2016

(87) PCT Pub. No.: WO2015/090458
PCT Pub. Date: Jun. 25, 2015

(65) Prior Publication Data
US 2016/0337845 A1    Nov. 17, 2016

(51) Int. Cl.
*H04W 4/00*    (2009.01)
*H04W 8/26*    (2009.01)
(Continued)

(52) U.S. Cl.
CPC .............. *H04W 8/26* (2013.01); *H04W 8/06* (2013.01); *H04W 8/20* (2013.01); *H04W 60/005* (2013.01); *H04W 8/18* (2013.01); *H04W 84/042* (2013.01)

(58) Field of Classification Search
CPC ....... H04W 8/26; H04W 8/06; H04W 60/005; H04W 8/20; H04W 84/042; H04W 8/18
(Continued)

(56) References Cited

U.S. PATENT DOCUMENTS 7,912,464 B2    3/2011  Jiang
7,944,914 B2 *  5/2011  Hurtta .................... H04W 8/20
                                                370/388
(Continued)

FOREIGN PATENT DOCUMENTS

EP    1662831 A1    5/2006
EP    2635056 A1    9/2013

OTHER PUBLICATIONS

3GPP, "3rd Generation Partnership Project; Technical Specification Group Core Network and Terminals; Gateway Location Register (GLR); Stage 2 (Release 11)", 3GPP TS 23.119 V11.0.0, Sep. 2012, 1-131.
(Continued)

*Primary Examiner* — Amancio Gonzalez
(74) *Attorney, Agent, or Firm* — Murphy, Bilak & Homiller, PLLC

(57) ABSTRACT

The invention relates to a method for controlling a communication activity of a roaming subscriber in a visited mobile network. The control node receives a combined subscriber profile (315) from a signaling transfer node (130) of the visited mobile communications network (60), the combined subscriber profile being a combination of a home subscriber profile (215) and a local subscriber profile (115). The home subscriber profile (215) contains subscriber related information of the roaming subscriber of the home mobile communications network (50). The local subscriber profile (115) contains subscriber related information of the roaming subscriber of the visited mobile communications network (60). The method further comprises storing the combined subscriber profile (315) with an active profile part and a non-active profile part, the active profile part being one of the home subscriber profile and the local subscriber profile, the non-active part being the other of the home subscriber profile and the local subscriber profile. The method further
(Continued)

comprises determining for the communication activity which part in the combined subscriber profile (315) shall be used for controlling the communication activity. The method further comprises selecting the determined part as the active part of the contained subscriber profile (215) and controlling the communication activity of the roaming subscriber based on the active part of the combined subscriber profile (315).

18 Claims, 11 Drawing Sheets

(51) Int. Cl.
*H04W 8/06* (2009.01)
*H04W 8/20* (2009.01)
*H04W 60/00* (2009.01)
*H04W 8/18* (2009.01)
*H04W 84/04* (2009.01)

(58) Field of Classification Search
USPC .................................................. 455/432.3
See application file for complete search history.

(56) References Cited

U.S. PATENT DOCUMENTS 9,155,118 B2 * 10/2015 Tsirtsis .................... H04L 69/14
9,585,005 B2 * 2/2017 Jiang ....................... H04W 8/20
2003/0092441 A1 5/2003 Taha et al.

OTHER PUBLICATIONS

3GPP, "3rd Generation Partnership Project; Technical Specification Group Core Network and Terminals; Mobile radio interface layer 3; Supplementary services specification; General aspects (Release 11)", 3GPP TS 24.010 V11.0.0, Sep. 2012, 1-31.

3GPP, "3rd Generation Partnership Project; Technical Specification Group Core Network and Terminals; Support of Optimal Routeing (SOR); Technical realization (Release 11)", 3GPP TS 23.079 V11.0.0, Sep. 2012, 1-41.

Unknown, Author, "Regulation (EU) No. 531/2012 of the European Parliament and of the Council of Jun. 13, 2012 on roaming on public mobile communications networks within the Union", Official Journal of the European Union, Jun. 30, 2012, 10-35.

* cited by examiner

```
InsertSubscriberDataArg ::= SEQUENCE {
  imsi                                              [0] IMSI                                         OPTIONAL,
  COMPONENTS OF                                         SubscriberData,
  extensionContainer                                [14] ExtensionContainer                         OPTIONAL,
  ...,
  naea-PreferredCI                                  [15] NAEA-PreferredCI                           OPTIONAL,
  -- naea-PreferredCI is included at the discretion of the HLR operator.
  gprsSubscriptionData                              [16] GPRSSubscriptionData                       OPTIONAL,
  roamingRestrictedInSgsnDueToUnsupportedFeature    [23]                                            NULL
                                                                                                    OPTIONAL,
  networkAccessMode                                 [24] NetworkAccessMode                          OPTIONAL,
  lsaInformation                                    [25] LSAInformation                             OPTIONAL,
  lmu-Indicator                                     [21] NULL                                       OPTIONAL,
  lcsInformation                                    [22] LCSInformation                             OPTIONAL,
  istAlertTimer[26] IST-AlertTimerValue                                                             OPTIONAL,
  superChargerSupportedInHLR                        [27] AgeIndicator                               OPTIONAL,
  mc-SS-Info                                        [28] MC-SS-Info                                 OPTIONAL,
  cs-AllocationRetentionPriority                    [29] CS-AllocationRetentionPriority
                                                         OPTIONAL,
  sgsn-CAMEL-SubscriptionInfo                       [17] SGSN-CAMEL-SubscriptionInfo                OPTIONAL,
  chargingCharacteristics                           [18] ChargingCharacteristics                    OPTIONAL,
  accessRestrictionData                             [19] AccessRestrictionData                      OPTIONAL,
  ics-Indicator [20]                                     BOOLEAN                                    OPTIONAL,
  eps-SubscriptionData                              [31] EPS-SubscriptionData                       OPTIONAL,
  csg-SubscriptionDataList                          [32] CSG-SubscriptionDataList                   OPTIONAL,
  ue-ReachabilityRequestIndicator                   [33] NULL                                       OPTIONAL,
  sgsn-Number                                       [34] ISDN-AddressString                         OPTIONAL,
  mme-Name [35]                                          DiameterIdentity                           OPTIONAL,
  subscribedPeriodicRAUTAUtimer                     [36] SubscribedPeriodicRAUTAUtimer              OPTIONAL,
  vplmnLIPAAllowed                                  [37] NULL                                       OPTIONAL,
  mdtUserConsent                                    [38] BOOLEAN                                    OPTIONAL,
  subscribedPeriodicLAUtimer                        [39] SubscribedPeriodicLAUtimer                 OPTIONAL,
  vplmn-Csg-SubscriptionDataList                    [40] VPLMN-CSG-SubscriptionDataList
                                                         OPTIONAL,
  additionalMSISDN                                  [41] ISDN-AddressString                         OPTIONAL,
  psAndSMS-OnlyServiceProvision                     [42] NULL                                       OPTIONAL,
  smsInSGSNAllowed                                  [43] NULL                                       OPTIONAL,
  vplmn-Profile                                     [44] VPLMN-Profile                              OPTIONAL
}
-- If the Network Access Mode parameter is sent, it shall be present only in
-- the first sequence if segmentation is used VPLMN-Profile ::= SEQUENCE {
  localMSISDN                                       [0] ISDN-AddressString                          OPTIONAL,
  localSupplementaryServices                        [1] Ext-SS-InfoList                             OPTIONAL,
  localSMSC-Address                                 [2] ISDN-AddressString                          OPTIONAL,
  localCAMELSubscriptionInfo                        [3] VlrCamelSubscriptionInfo                    OPTIONAL
  ...
}
```

FIG. 5

```
ProvideRoamingNumberArg ::= SEQUENCE {
    imsi                                          [0] IMSI,
    msc-Number                                    [1] ISDN-AddressString,
    msisdn                                        [2] ISDN-AddressString
    lmsi                                          [4] LMSI                                          OPTIONAL,
    gsm-BearerCapability                          [5] ExternalSignalInfo                            OPTIONAL,
    networkSignalInfo                             [6] ExternalSignalInfo                            OPTIONAL,
    suppressionOfAnnouncement                     [7] SuppressionOfAnnouncement                     OPTIONAL,
    gmsc-Address                                  [8] ISDN-AddressString                            OPTIONAL,
    callReferenceNumber                           [9] CallReferenceNumber                           OPTIONAL,
    or-Interrogation                              [10] NULL                                         OPTIONAL,
    extensionContainer                            [11] ExtensionContainer                           OPTIONAL,
    ... ,
    alertingPattern                               [12] AlertingPattern                              OPTIONAL,
    ccbs-Call                                     [13] NULL                                         OPTIONAL,
    supportedCamelPhasesInInterrogatingNode       [15] SupportedCamelPhases                         OPTIONAL,
    additionalSignalInfo                          [14] Ext-ExternalSignalInfo                       OPTIONAL,
    orNotSupportedInGMSC                          [16] NULL                                         OPTIONAL,
    pre-pagingSupported                           [17] NULL                                         OPTIONAL,
    longFTN-Supported                             [18] NULL                                         OPTIONAL,
    suppress-VT-CSI                               [19] NULL                                         OPTIONAL,
    offeredCamel4CSIsInInterrogatingNode          [20] OfferedCamel4CSIs                            OPTIONAL,
    mtRoamingRetrySupported                       [21] NULL                                         OPTIONAL,
    pagingArea                                    [22] PagingArea                                   OPTIONAL,
    callPriority                                  [23] EMLPP-Priority                               OPTIONAL,
    mtrf-Indicator                                [24] NULL                                         OPTIONAL,
    oldMSC-Number                                 [25] ISDN-AddressString                           OPTIONAL,
    lastUsedLtePLMN-Id                            [26] PLMN-Id                                      OPTIONAL,
    localProfile                                  [27] NULL                                         OPTIONAL
}
```

FIG. 6

```
RoutingInfoForSM-Res ::= SEQUENCE {
    imsi                    IMSI,
    locationInfoWithLMSI    [0] LocationInfoWithLMSI,
    extensionContainer      [4] ExtensionContainer       OPTIONAL,
    ...,
    ip-sm-gwGuidance        [5] IP-SM-GW-Guidance        OPTIONAL,
    localProfile            [6] NULL                     OPTIONAL
}
```

FIG. 7

```
MT-ForwardSM-Arg ::= SEQUENCE {
    sm-RP-DA                    SM-RP-DA,
    sm-RP-OA                    SM-RP-OA,
    sm-RP-UI                    SignalInfo,
    moreMessagesToSend          NULL                        OPTIONAL,
    extensionContainer          ExtensionContainer          OPTIONAL,
    ...,
    smDeliveryTimer             SM-DeliveryTimerValue       OPTIONAL,
    smDeliveryStartTime         Time                        OPTIONAL,
    smsOverIP-OnlyIndicator     [0] NULL                    OPTIONAL,
    correlationID               [1] CorrelationID           OPTIONAL,
    localProfile                [2] NULL                    OPTIONAL
}
-- SM-DeliveryTimerValue contains the value used by the SMS-GMSC
```

FIG. 8

LOCAL NUMBER FOR ROAMING SUBSCRIBER

TECHNICAL FIELD

The invention relates to a method, system and computer program for signaling of a mobility activity of a roaming subscriber in a visited mobile communications network, where the roaming subscriber is a subscriber of a home mobile communications network.

BACKGROUND

When traveling abroad, a subscriber of a mobile phone is reachable on the Home PLMN's (Public Land Mobile Network) (HPLMN) MSISDN (Mobile Subscriber ISDN (Integrated Services Digital Network) Number). A call to the MSISDN leads to the establishment of a roaming call leg, from GMSC (Gateway Mobile Switching Center) in HPLMN to Visited MSC (VMSC) in (foreign) Visited PLMN (VPLMN). When the call to the MSISDN is established from the VPLMN where the subscriber currently resides, then the call is established as a 'tromboning call'. That is to say, the call is established from the VPLMN where the call originates, to the HPLMN of the called subscriber and from the HPLMN back to the VPLMN where the called party currently resides. This is a direct result of the principles of 'roaming', as currently applied in the GSM/3G mobile network.

The 'tromboning' aspect of establishing a terminating call towards the roaming subscriber, when the call is established from the same visited country, is generally considered a drawback associated with the contemporary GSM/3G mobile network. The implication is namely that (a) the calling party pays international call rate, for the call from VPLMN to HPLMN and (b) the called party pays for the international roaming call leg, for the establishment of the call from HPLMN to VPLMN. Hence, even though calling and called party currently reside in the same country, they both pay international call charge.

Basic Optimal Routing (BOR) has been specified by ETSI (European Telecommunications Standards Institute) as a potential remedy for this solution. BOR entails that the MSC in the visited country acts as GMSC and interrogates the HLR (Home Location Register) in the HPLMN of the called subscriber. If the called subscriber is located in the same country as the MSC where the call is established, then the HLR may provide a roaming number to the GMSC, which has the effect that the call is established locally.

BOR is commercially not implemented. Put differently, although BOR is formally specified, it has limitations that hamper commercial deployment of it. For example, agreement is needed between HPLMN and VPLMN, since BOR requires coordinated action by the two networks. In addition, BOR provides no clear guideline how the charging of the call shall be done. Interaction between BOR and Call forwarding is a further area that leads to unforeseen, non-transparent call cases. In addition, terminating call handling is often subject to special handling in the GMSC, such as prepaid, personal greeting service or Free-divert-to-voice-mail. Such service invocation can't be handled by a GMSC in a network other than the called party's HPLMN. Hence, BOR is in practice not a suitable solution.

Another solution would be the use of a local subscription, i.e. buying a local SIM (Subscriber Identity Module) card. Although the subscriber is now reachable through a local number, for which local call rate applies for the calling party and a zero call rate for the called party, the subscriber is no longer reachable under his/her home MSISDN. In addition, purchasing a local SIM card has the hassle of swapping cards in the phone and safely storing a subscriber's home SIM card. This is especially disadvantageous considering the fact that much data as well as applications can be stored on the SIM card. That data will become inaccessible. SIM swap is, for the issue at hand, considered not a useful solution. Of course, one may purchase a local phone+SIM and keep the home SIM card in the home mobile phone. This method is considered equally unpractical, for reason of SIM card stored data, as described, and the hassle of having two phones to keep on you. In addition, this has the disadvantage that data downloaded/stored/processed on one phone is not available on the other phone.

As an example publication U.S. Pat. No. 7,912,464 is presented, disclosing a solution whereby the calling party can be reached on a locally-routable-international number. For example, a subscriber with MSISDN +31 6 516 xxx who is traveling to Singapore may be called locally on the number *31 6 516 xxx. Such service may e.g. be offered by Singtel and works only when the called subscriber is currently registered in an MSC from Singtel. The leading * (or other designated character combination, as decided by the operator) serves as an indication to the MSC where the call is established that the call shall be routed locally. The solution entails that the MSC routes the call to a special service platform, which obtains a roaming number in the MSC where the called party is currently registered. This solution has the disadvantage that the calling party has to use special character combination to establish the call. So, it is still not transparent for the calling party.

In certain circumstances, the called subscriber may explicitly wish to be reachable on a local number, without using a different phone and without using a different SIM card. One prominent example is the case that the subscriber resides for a long(er) duration in the visited country for business or other purpose. So, (s)he wants to allow others (business relations) to reach him/her on a local number. However, the subscriber wants to remain reachable on his/her home MSISDN as well. The currently known solutions don't offer this capability, as they have one or more of the following disadvantages:

- The subscriber has to use another, locally purchased/rented terminal;
- The subscriber has to use a different SIM card;
- The subscriber can't provide his/her local contacts a local phone number;
- The subscriber is not reachable on his/her home MSISDN;
- The calling party has to dial a special prefix in front of the number.

The concept of Multiple subscriber profile (MSP; 3GPP TS 23.097) is known from the 3G network. MSP will, however, not resolve the problem at hand. MSP is strictly associated with one particular operator. An MSP subscriber may receive multiple MSISDNs of one operator, but when the subscriber is roaming abroad, (s)he will be reachable under his/her home MSISDN only. MSP has no relation with a visited network and does not have the capability to allow the subscriber to be reachable under a local MSISDN.

The Gateway Location Register (GLR; 3GPP TS 23.119) allows for using a 'Location register' in the visited network. The GLR acts as an 'HLR Proxy' in the visited network. As such, it keeps a local copy of the subscriber data from the home network. The GLR has, however, no relation to the visited network HLR. The GLR can't be used for assigning a local MSISDN to the subscriber. The subscription profile stored in the GLR in the visited network is still a copy of the Home subscriber profile, i.e. no relation to the visited network.

The concept of Alternative Roaming Provider (ARP), which forms part of EU Roaming Regulation III (EU Regulation 531/2012) stipulates that a roaming subscriber should have the possibility to be served (specifically: charged) by a different service provider, namely the ARP, than his home PLMN provider when roaming abroad (in EU). When served by an ARP, a user still has the same service profile from the home network and the same MSISDN. RR III relates only to charging of communication sessions when abroad.

A further possibility would be to use 'multi-SIM'. A UICC (Universal Integrated Circuit Card) may be equipped with multiple SIM/USIM applications. When switching on the phone, the user gets the option presented to select the SIM/USIM (Universal SIM) from which he/she wants to start the phone. However when you have a UICC with a SIM/USIM of a local network, there is the dilemma that you're not reachable on your home MSISDN.

Accordingly, a need exists to avoid the above-mentioned drawbacks and to provide a possibility for a roaming subscriber to be reached locally in the visited network while maintaining the option to be reached via the home subscription in an easy way.

SUMMARY

It is an object of the present invention to provide a method, apparatus and computer program which obviate or reduce at least one or more of the disadvantages mentioned above.

According to a first aspect a method is provided, by a network node, for signaling a mobility activity of a roaming subscriber in a visited mobile communications network, wherein the roaming subscriber is a subscriber of a home mobile communications network. A received location update message is transmitted for the roaming subscriber, wherein the transmitted received location update message is transmitted to a home subscriber database in the home mobile communications network. The received location update message for the roaming subscriber is furthermore transmitted to a local subscriber database which is the subscriber database of the visited mobile communications network. A home subscriber profile is received for the roaming subscriber from the home subscriber database, wherein the home subscriber profile contains subscriber related information of the roaming subscriber of the home mobile communications network. Furthermore, a local subscriber profile for the roaming subscriber is received from the local subscriber database, wherein the local subscriber profile contains subscriber related information of the roaming subscriber of the visited mobile communications network. A combined subscriber profile is generated for the roaming subscriber, wherein the combined subscriber profile is a combination of the home subscriber profile and the local subscriber profile. The generated combined subscriber profile is then transmitted to a control node which controls a communication activity of the roaming subscriber in the visited mobile communications network.

The network node can be a signaling transfer node.

For the roaming subscriber a combined subscriber profile is used which contains components of the home mobile communications network and of the visited mobile communications network. This has the effect that the subscriber is now functionally associated with two mobile communications networks, the home mobile communications network and the visited mobile communications network, and has a subscription profile associated with each of the two networks. The received location update message may be received from the control node in the visited mobile communications network and may be transmitted to the home subscriber database and the local subscriber database. Furthermore, the received home subscriber profile is received from the home subscriber database and the local subscriber profile is received from the local subscriber database.

For transmitting the received location update message to the home subscriber database, the home mobile communications network is determined, wherein the location update message is forwarded in the home mobile communications network to the home subscriber database. A global identification number uniquely identifying the roaming subscriber in different mobile networks can be used with a first translation mechanism to determine the home mobile communications network to which the received location update message shall be transmitted. For transmitting the received location update message to the local subscriber database it is possible that a second translation mechanism different to the first mechanism is used to identify the local subscriber database to which the received location update message shall be transmitted. The sending of the location update message towards the home mobile communications network may be based on the IMSI (International Mobile Subscriber Identity) of the subscriber, a number that uniquely identifies a mobile subscriber in the globally existing mobile communication networks. When the location update message is transmitted to the "home subscriber database" of the visited mobile communications network, a different translation mechanism may be used which can make sure that the location update message is sent to the subscriber database of the network in which the subscriber is currently located.

Furthermore, it is possible that the roaming subscriber first subscribes in the visited mobile communications network to a service that facilitates the use of a combined subscriber profile. If this is the case, an indicator is contained in the signaling transfer node. When receiving the location update message it may be determined whether the indicator is set, the indicator indicating that the foreign subscriber is associated with a number belonging to the visited mobile communications network. If the indicator is set, the received location update message is transmitted to both the local subscriber database and the home subscriber database, wherein, if the indicator is not set, the received location update message is transmitted only to the home subscriber database. If the indicator is not set, this can mean that this roaming subscriber is a normal roaming subscriber which has not subscribed to the use of the combined subscriber profile. These normal roaming subscribers are handled as known by transmitting the location update message only to the home subscriber database.

It is possible that the network node, for transmitting the location update message to the home subscriber database and to the local subscriber base, uses a message originating address of the signaling transfer node allowing the signaling transfer node to be identified, e.g. by the receiving party of the message. The use of the message originating address can help to ensure that other messages resulting from the sending of the location update message traverse again the network node, by which the location update message has been transmitted.

The invention furthermore relates to a method for controlling a communication activity of the roaming subscriber in the visited mobile communications network by a control node of the visited mobile communications network. The control node receives a combined subscriber profile from a signaling transfer node of the visited mobile communications network, wherein the combined subscriber profile is a combination of the home subscriber profile and the local subscriber profile, the home subscriber profile containing the subscriber related information of the roaming subscriber of the home mobile communications network, and the local subscriber profile containing subscriber related information of the roaming subscriber of the visited mobile communications network. The combined subscriber profile is stored by the control node with an active profile part and a non-active profile part, the active profile part being one of the home subscriber profile and the local subscriber profile, wherein the non-active part is the other of the home subscriber profile and the local subscriber profile. For the communication activity it is then determined which part in the combined subscriber profile shall be used for controlling the communication activity. The determined part is then selected as the active part of the combined subscriber profile and the communication activity of the roaming subscriber is controlled based on the selected part of the combined subscriber profile, which is then the active part.

The communication activity of the control node is a communication and signaling activity as the control node may be responsible for the communication activity and signaling activity of the roaming user.

With the received combined subscriber profile the control node in the visited mobile communications network determines, based on several criteria, which of the profiles should be used for the communication activity, such as a call or an SMS (Short Message Service). The received combined subscriber profile is the combined subscriber profile described above in connection with the signaling transfer node and is received from the signaling transfer node where the combined subscriber profile was generated.

The communication activity can be an activity originating at the roaming user. Here the part of the combined subscriber profile that shall be used for controlling the communication activity is detected and the communication activity is controlled based on the detected part of the combined subscriber profile.

When the communication activity is an activity terminating at the roaming subscriber, it may be determined whether a subscriber identification number or called party number belonging to the visited mobile communications network or belonging to the home mobile communications network is used to address the roaming subscriber. The mobile communications network to which the subscriber identification number/called party number belongs is determined and the part of the combined subscriber profile relating to the determined mobile communications network is detected and used to control the communication activity terminating at the roaming subscriber. By way of example when the roaming subscriber receives a call, the called party number may belong to the visited network or to the home network. When the called number belongs to the home network, the home subscriber profile is used, whereas when the called number is a number of the visited network, the local subscriber profile is used for controlling the call.

Here it is possible that the called party number used for the activity terminating at the roaming subscriber is indicated to the roaming subscriber. The roaming subscriber then knows whether he or she is addressed at his/her home number or at his/her local number. The indication may be explicit by providing the actual number that was used to address the subscriber or implicit, e.g. by providing a profile index or a code, such as a first number, such as "1" meaning a local number and "2" meaning the number of the home network.

The roaming subscriber can furthermore determine which part of the combined subscriber profile should be used for a communication activity. By way of example an input of the roaming subscriber may indicate which part in the combined subscriber profile shall be used for controlling the communication activity. For an activity originating at the roaming subscriber, the subscriber can indicate to the mobile device which subscription to use.

The input may contain a profile command which identifies which part of the combined subscriber profile shall be used for controlling the communication activity. When the profile command is detected by the control node, the part of the combined subscriber profile that shall be used for the communication activity is selected based on the detected profile command. By way of example the roaming subscriber may dial a certain sequence of digits which correspond to a service code, each sequence of digits individually selecting one of the two subscriber profiles. This means that the input may contain a dialed profile identification number when the communication activity is originating at the roaming subscriber. The part of the combined subscriber profile to be used for the communication is then selected based on the dialed profile identification number.

Furthermore, the situation may occur that the local subscriber profile is the active profile of the combined subscriber profile and the communication activity is an activity originating at the roaming subscriber. Here a calling party number of the roaming subscriber belonging to the visited mobile communications network can be used to identify the originating subscriber. By way of example when the roaming subscriber calls another party which is a subscriber of the visited mobile communications network, the telephone number belonging to the visited mobile communications network can be used to identify the roaming subscriber.

Furthermore, it is possible that a B-number analysis for the originating activity is carried out in the same manner as for subscribers of the visited mobile communications network. By way of example in an originating call, when a subscriber dials a certain number which is a number of the visited mobile communications network or a number of the country in which the roaming subscriber is currently located, the call is considered a local call and the local subscriber profile may be used for controlling this call.

When the communication activity is an activity terminating at the roaming subscriber and is directed to a local called party number, a called party number of the roaming subscriber belonging to the visited mobile communications network is used to identify the roaming subscriber to which the activity is directed. The roaming subscriber then knows whether the activity terminating at his or her mobile device is an activity directed to the subscriber as a local subscriber or to the home subscription. Here it can be signaled to the roaming subscriber that the activity terminating at the roaming subscriber is directed to the local number.

The above-mentioned local subscriber profile can comprise at least one of the following data: e.g. a subscriber identification number used to identify the roaming subscriber belonging to the visited mobile communications network, a set of basic services relating to the visited mobile communications network, a set of supplementary services relating to the visited mobile communications network, an address of a short message service center of the visited mobile communications network and CAMEL subscription data for the visited mobile communications network.

The home subscriber profile can correspond to the home subscriber profile known in the art.

The invention furthermore relates to a signaling transfer node which is configured to signal the mobile activity of the roaming subscriber in the visited mobile communications network. The signaling transfer node comprises a transmitter configured to transmit a received location update message to a home subscriber database in the home mobile communications network. The transmitter may furthermore transmit the received location update message for the roaming subscriber to a local subscriber database. A receiver is configured to receive a home subscriber profile for the roaming subscriber, the home subscriber profile containing the subscriber related information of the roaming subscriber of the home mobile communications network. The receiver furthermore receives the local subscriber profile which contains the subscriber related information of the roaming subscriber of the visited mobile communications network. A processing unit is configured to generate the combined subscriber profile for the roaming user which is a combination of the home subscriber profile and the local subscriber profile. The processing unit furthermore initiates the transmission of the generated combined subscriber profile to the control node which controls the communication activity of the home subscriber in the visited mobile communications network. The processing unit of the signaling transfer node can operate as mentioned above in connection with the method steps explained for the signaling transfer node with the home subscriber profile being received from the home subscriber database and the local subscriber profile being received from the local subscriber database.

The invention furthermore relates to the control node which controls the communication activity of the roaming subscriber in the visited mobile communications network. The control node comprises a receiver configured to receive a combined subscriber profile which is a combination of the home subscriber profile and the local subscriber profile, e.g. from the signaling transfer node. The control node comprises a storage unit configured to store the combined subscriber profile with an active profile part and a non-active profile part, wherein the active profile part is one of the home subscriber profile and the local subscriber profile and the non-active part being the other of the home subscriber profile and the local subscriber profile. A processing unit is configured to determine for the communication activity which part in the combined subscriber profile shall be used for controlling the communication activity and is configured to select the determined part of the combined subscriber profile as the active part of the combined profile and to control the communication activity of the roaming subscriber based on the active part of the combined subscriber profile.

The processing unit can be configured to carry out the steps mentioned above in connection with the control node. By way of example the processing unit can be configured to determine which part of the combined subscriber profile is the active part when the activity originating at the roaming subscriber should be carried out and can control the communication activity based on the active part of the combined subscriber profile. When the communication activity is an activity terminating at the roaming subscriber, the processing unit of the control unit can be configured to determine whether a called party number belonging to the visited mobile network or belonging to the home mobile network is used to address the roaming subscriber. The processing unit can then determine the mobile network to which the called party number belongs and activates the part of the combined subscriber profile relating to the determined network. The active part is then used to control the communication activity at the roaming subscriber. The processing unit can be configured to carry out the different steps mentioned above in connection with the control node.

The invention furthermore relates to a computer program comprising program code to be executed by a processing unit of the control node, wherein the execution of the program code causes the processing unit to perform the steps mentioned above in connection with the control node.

It should be understood that the different features and embodiments mentioned above may be used in the described context. However, each of the features and embodiments described above and described further below may be used alone or in connection with any of the other features described above or below.

BRIEF DESCRIPTION OF THE DRAWINGS

FIG. 5 is a table illustrating an embodiment of the combined subscriber profile.

FIG. 6 is a table illustrating an embodiment of a MAP (Mobile Application Part) Provide Roaming Number (PRN)

FIG. 7 is a table illustrating an embodiment of a subscriber database, enhanced for an SMS service.

FIG. 8 is a table illustrating an embodiment of a local profile parameter, included for an SMS service.

DETAILED DESCRIPTION OF EMBODIMENTS

In the following, concepts in accordance with exemplary embodiments of the invention will be explained in more detail with reference to the accompanying drawings.

Figure 1:
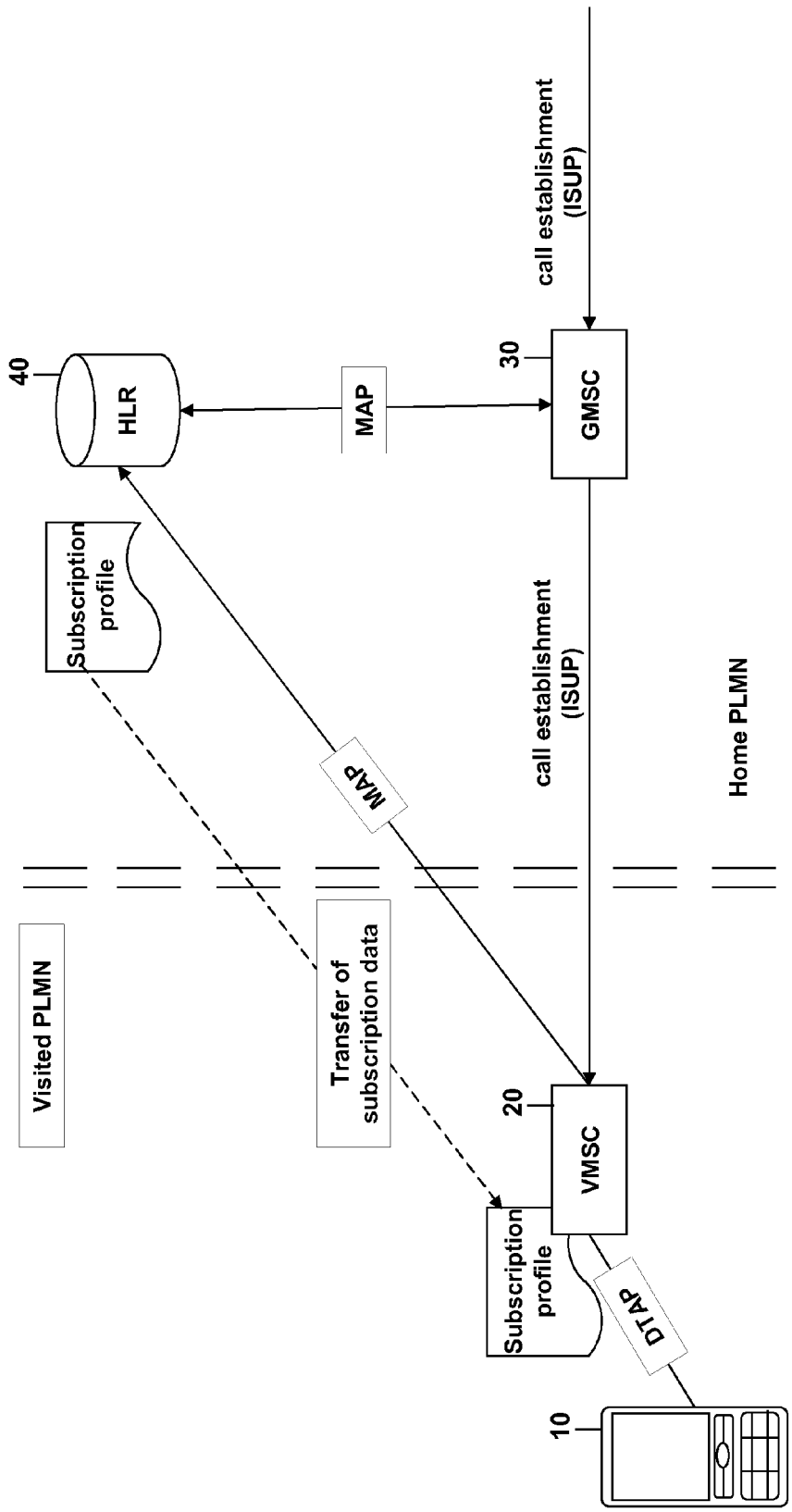
FIG. 1 is a block diagram illustrating a mobile device attached to a foreign mobile communications network as known in the art.

For a better understanding of the invention, it is explained in more detail in connection with FIG. 1 how a subscriber with a mobile user entity 10 registers in a foreign mobile communications network. When the mobile device 10 attaches to a mobile switching center (MSC) in a visited mobile communications network, VMSC 20, the VMSC establishes contact with the HLR 40 in the roaming subscriber's Home PLMN (HPLMN). The HLR 40 sends a subset of the subscriber profile towards the MSC 20. The subscriber is now registered in the MSC 20 and can now establish calls, receive calls, send messages, receive messages, terminating calls being established via a gateway MSC, GMSC 30, of the home mobile communications network.

The person's profile comprises in a non-exhaustive manner inter alia the MSISDN, i.e. the public identity used for communication services such as voice calls or messages. The profile furthermore comprises a set of basic services, e.g. for telephony, messaging etc. The profile furthermore comprises a set of supplementary services, e.g. for call forwarding, call hold, call waiting, etc. Furthermore, value added services can be provided, such as a prepaid service or a VPN (Virtual Private Network) service.

The profile contained in the VMSC 20 remains the subscriber's home profile which is a main aspect of the GSM (Global System for Mobile Communications)/3G mobile network. Some of the implications of this principle are that when a subscriber establishes a call, he or she will be identified through his MSISDN, i.e. his HPLMN phone number.

A further principle is that the subscriber is reachable only on his/her Home MSISDN, being a public number associated, when roaming, with another country than the country in which the person currently resides. For people in the country where the subscriber currently resides, the person's MSISDN is considered a foreign number. Furthermore, when the subscriber sends a message, the MSISDN will be used to identify the sender of the message and the subscriber can receive a message only on his HPLMN MSISDN. The above-mentioned characteristics can be attributed to at least the following aspects of GSM/3G roaming:

The HLR in the visited/foreign mobile communications network/PLMN has no knowledge of this subscriber.

The subscriber profile in the MSC in the visited network is purely based on the subscriber's subscription profile as kept in the HLR in the HPLMN, it is a subset of the subscriber's home profile.

As will be explained in more detail below, the present invention proposes novel methods and novel nodes which are devised around the following concepts:

1 The HLR in the visited mobile network, the local subscriber database in the visited mobile communications network, contains a set of subscriber profiles, each of which may be dynamically associated with an inbound roaming subscriber.

2. When a foreign subscriber registers in this PLMN and the subscriber has signed up for features of the invention, also named "local MSISDN service" hereinafter, the subscriber profile in the PLMN's HLR that is dynamically associated with this inbound roaming subscriber is synchronized with the registration in the MSC. In other words, the HLR in the subscriber's HPLMN is synchronized with the registration of this subscriber in the foreign MSC and the HLR in the VPLMN is synchronized with the registration of the subscriber in the local MSC. A new subscriber profile, the combined subscriber profile that is stored in the MSC of the visited network, is a combination of (i) subscription data related to the subscriber's HPLMN, this being the subscriber's regular home profile, and (ii) subscription data related to the visited mobile network.

The effective result is that the subscriber is now functionally associated with two networks, the home mobile network and the visited mobile network and has a subscription profile, a combined subscriber profile in the visited control node, the MSC, associated with each one of the two networks.

The double subscription profile does not comprise the IMSI (International Mobile Subscriber Identity), as the IMSI is tightly coupled to the SIM/USIM (Universal Subscriber Identity Module) in UICC, thus the name SIM card. In addition, the subscription profile contained in the HLR does not comprise authentication data. Authentication of the subscriber remains with the home subscriber database, HLR, in the subscriber's HPLMN.

Figure 2:
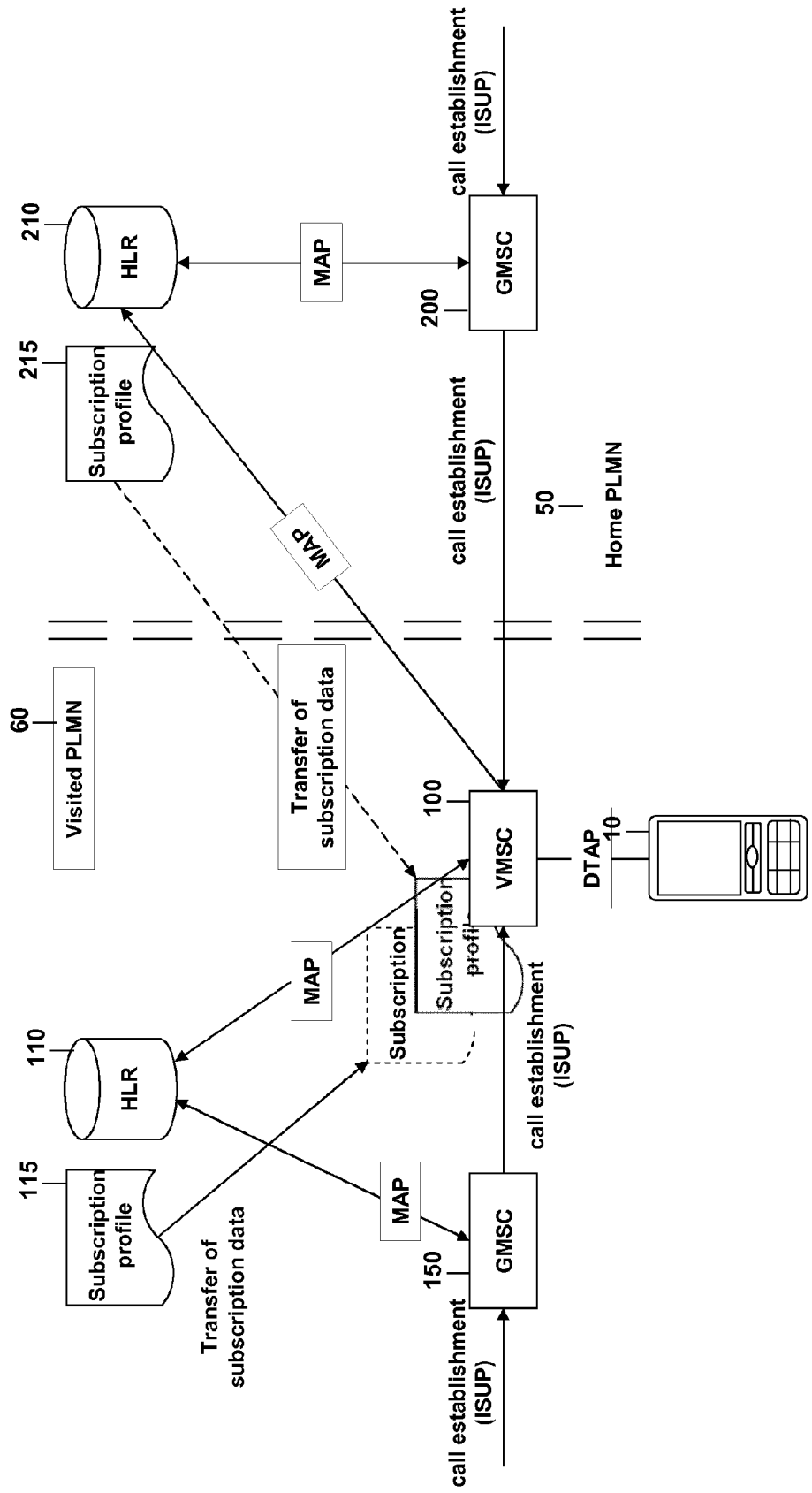
FIG. 2 Is a block diagram illustrating a roaming user registering in a visited mobile communications network according to an embodiment of the invention.

This is explained in more detail with reference to FIG. 2. When a roaming subscriber with a mobile user entity 10 registers at the MSC 100 controlling communication activities in the visited network 60, the HLR 210 of the home mobile network 50 is contacted and a home subscriber profile 215 is transferred to the visited mobile network. Furthermore, the subscriber profile HLR 110 in the visited network 60 is contacted and a local subscriber profile 115 stored for this roaming subscriber in the HLR 110 is retrieved from the HLR and sent to the VMSC 100 as will be explained in further detail below.

The home subscriber profile 215 comprises the regular profile as received from the HLR in the HPLMN 50. The local subscriber profile 115, also named visited profile hereinafter, comprises a local MSISDN, a restricted set of supplementary service (CLIP (Calling Line Identification Presentation), CLIR (Calling Line Identification Restriction), call forwarding, call hold and retrieve, call waiting). The local profile furthermore comprises an SMSC (Short Message Service Center) address and CAMEL (Customized Applications for Mobile Network Enhanced Logic) subscription data. The subscription data related to the visited network replaces in the local subscriber profile the corresponding parameters of the home subscriber profile, resulting in the local subscriber profile. Hence, the local subscriber profile 115 sent from HLR 110 to the VMSC 100 is not a complete GSM/3G profile. Instead, by replacing certain parameters of the home location profile by corresponding parameters from the visited profile, a local profile is created.

The applicability of the two subscription profiles is as follows:

1) At any moment one of the two profiles shall be the active profile, either the home subscriber profile 215 or the local subscriber profile 115 and the other profile shall be the passive or non-active profile.

2) When a subscriber establishes a call, the call shall be established based on the active subscription profile. This implies, among others, that the MSISDN of the active subscription profile is used as calling line or calling party identity.

3) When a subscriber sends a Short Message, the message shall be sent based on the active subscription profile. This implies, among others, that MSISDN of the active profile is used to identify the sender of the Short Message. In addition, if the message is sent based on the VPLMN profile, then the SMSC address of the VPLMN profile is used.

4) The subscriber may receive a call on his HPLMN MSISDN or on the VPLMN MSISDN. The call shall be handled, in the VMSC 100, based on the profile belonging to the MSISDN used to establish the call, i.e. based on the called party number. The MAP PRN (Provide Roaming Number) that is used during call establishment, for the case that the call is established towards the VPLMN MSISDN, shall, hereto, contain an indication of the number that was used to establish the call, i.e. the VPLMN MSISDN. The VMSC hence knows which profile to use for this call.

5) The subscriber may receive a Short message sent towards his HPLMN MSISDN or sent towards the VPLMN MSISDN. The message shall be handled, in the VMSC, based on the profile belonging to the MSISDN used to send the message.

The sending of MAP MT-ForwardSM (Mobile Terminated Forward Short Message) from SMSC of originating party towards VMSC of destination party is based on IMSI. It does not comprise MSISDN. Hence: adaptation is needed to MT-ForwardSM, to let it contain also MSISDN. VPLMN has to use SMS Home Routing to force terminating SMS to traverse HPLMN for the case that the SMS originates from other PLMN. Through home routing of the SMS, the adaptation to MT-ForwardSM can be applied also when SMS originates from other PLMN.

6) The subscriber may, when establishing a call, signal to the MSC that the Passive profile shall be used for that call, instead of the Active profile.
7) The subscriber may, when sending a Short Message, signal to the MSC that the Passive profile shall be used for that Short Message, instead of the Active profile.
8) When the subscriber applies supplementary service administrative control, such as Call forwarding interrogation, the supplementary service administrative control command shall be processed in accordance with the Active profile. For example, when the VPLMN profile is currently the active profile, then a Call forwarding interrogation shall result in informing the subscriber about the state of Call forwarding related to calls established towards the VPLMN MSISDN.

The charging of the communication activity may be as detailed below.

Communication that is established based on the VPLMN user profile shall be chargeable by the visited network operator. Examples include:

When establishing a call from the VPLMN and using the local MSISDN as calling party number and as public identity for that call, the cost of this originating call is paid towards the VPLMN operator.

When receiving a call in the VPLMN, whereby that call was established towards the visited PLMN MSISDN, the cost of this terminating call is paid towards the VPLMN operator.

Receiving a terminating call whilst in the HPLMN is normally free of charge. When receiving a call that is established towards the visited PLMN MSISDN whilst residing in that visited PLMN, this can also be free of charge.

When sending an SMS from the VPLMN and using the local MSISDN as public identity for that message, the cost of this message is paid towards the VPLMN operator.

Charging by the visited PLMN operator may be done through CAMEL based prepaid charging or through CDR (Call Detail Record) processing. CAMEL based prepaid charging by visited PLMN operator may e.g. be accomplished by including in the Visited PLMN profile CAMEL subscription information; specifically O-CSI (O-CAMEL Subscription Information). It is further required that the CDRs contain a special marking that the call is established based on visited PLMN profile. Such marking allows for processing the CDR locally, instead of sending the CDR to the inbound subscriber's HPLMN.

Furthermore, when packet switched services are used by the roaming subscriber, the situation may be as follows:

The registration to the MSC in the visited network may be combined with attachment to the SGSN (Serving GPRS Support Node). Dual attachment, whereby the mobile entity is attached to the MSC and to the SGSN through a single attachment request, is common methodology. The SGSN may select a local GGSN (Gateway GPRS Support Node) or a home GGSN for internet access, when the subscriber activates a mobile data bearer. The selection of local GGSN versus Home GGSN may be synchronized with the active subscriber profile. At one particular moment, the subscriber's Home profile is the active profile or the subscriber's local profile. The SGSN can take that aspect into account for APN (Access Point Name) analysis, for selecting the GGSN. When the subscriber's local profile is the active profile, the APN analysis in SGSN results in the selection of local GGSN. When the subscriber's home profile is the active profile, the APN analysis in SGSN results in the selection of home GGSN. There is in this manner no need for the subscriber to change APN in the terminal. When the local profile is applicable, the CDRs generated by SGSN and/or GGSN shall contain a corresponding marking.

Functional connection between SGSN and MSC is common methodology. This functional connection may be used by SGSN to check which profile is the active profile, and to apply corresponding APN analysis, as described above.

Summarizing, in a more general context the SGSN selects a GGSN based on the part of the combined profile that is currently the active profile part.

One aspect of the invention is the signaling transfer node or signaling transfer point, STP in the VPLMN 60. The signaling transfer node, STP, shall determine that a subscriber that is attaching to an MSC is a subscriber that has signed up for the local MSISDN. Communication between the MSC in VPLMN and HLR in HPLMN during the attachment comprises MAP location update (LU) and MAP insert subscriber data (ISD).

Figure 3:
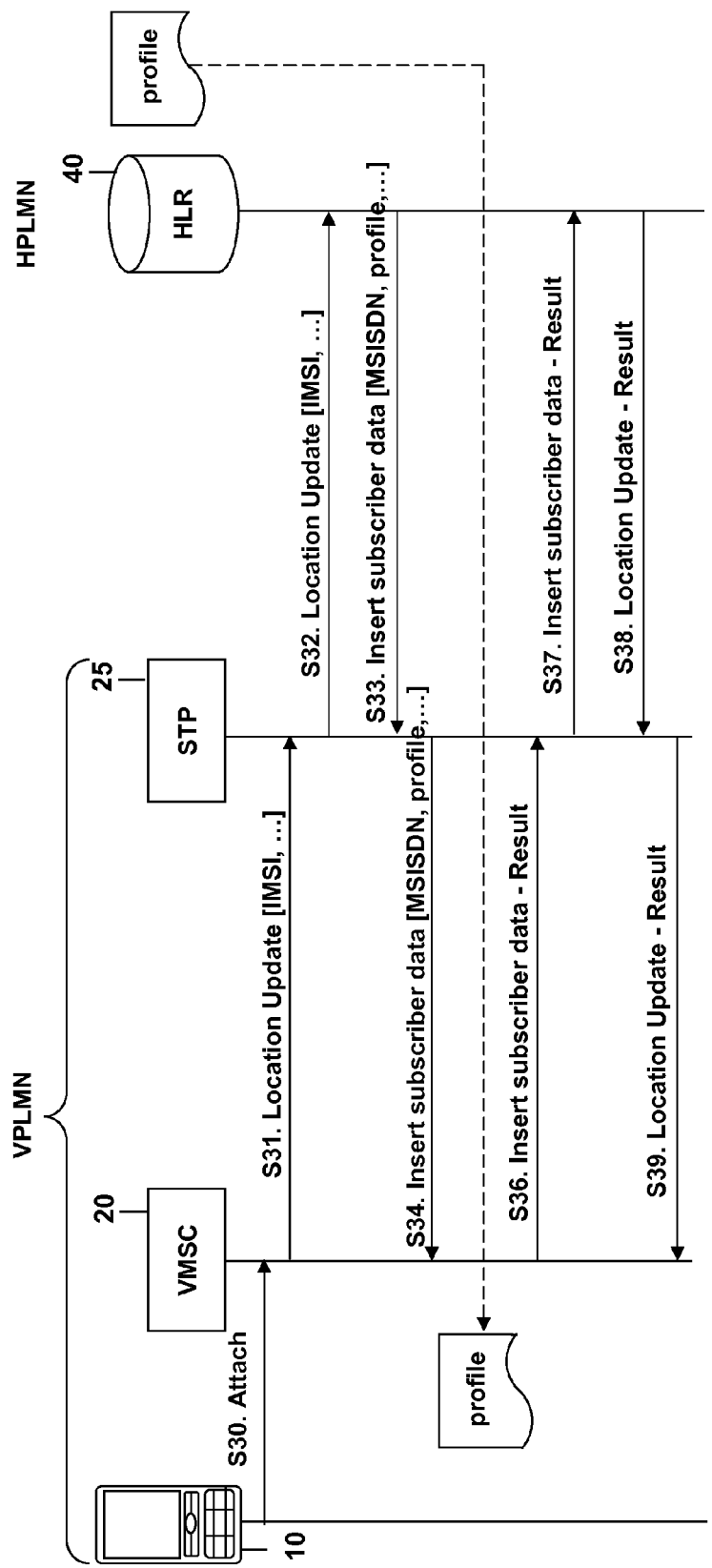
FIG. 3 is a signaling diagram illustrating a message exchange for the transfer of subscription data from a home location register HLR to a visited mobile switching center MSC as known in the art.

In FIG. 3 the signaling between the roaming subscriber, the VMSC 20, the signaling transfer point 25 and the HLR 40 in the home mobile network as known in the art is shown. In step S30 an attach message is sent from the mobile device to the VMSC 20, a location update message being sent to STP 25 in the VPLMN in step S31. STP 25 transmits the location update message to the HLR 40 in the home network where subscription data are sent back to the STP in step S33. The insert subscription data are forwarded to the MSC 20 in step S34. The dashed line in step S34 represents the transfer of the subscription data from the HLR in the home mobile network to the VMSC 20. In step S36, the insert subscription data result message is transmitted to STP 25 from where it is forwarded to HLR 40 in step S37, the location update result message being sent to STP in step S38 from where the message is transmitted further to the VMSC 20 in step S39.

Figure 4:
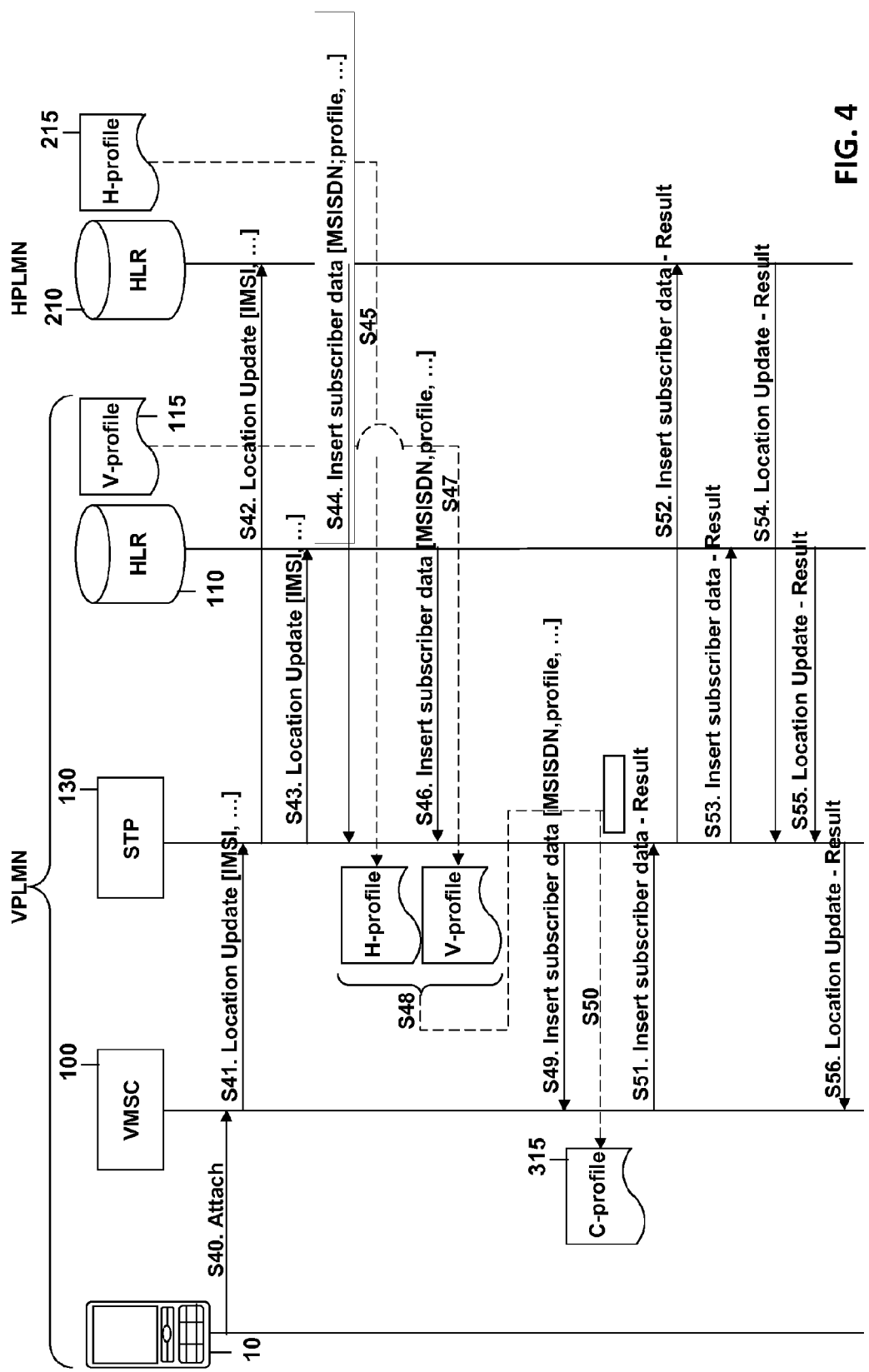
FIG. 4 is a signaling diagram illustrating a transfer of subscription data in a combined subscriber profile including features of the invention.

With reference to FIG. 4 the attachment procedure according to the invention is explained in more detail. The attachment procedure is enhanced for subscribers that have previously signed up for the local MSISDN service, also called combined subscriber profile service. In steps S40 to S42, the attachment corresponds to the steps shown in FIG. 3. However, as shown in step 43, the location update message is also transmitted to HLR 110 in the visited mobile communications network. In step S44 subscriber data is sent back to STP from the HLR 210 in the home network. As symbolized in step S45, the home subscriber profile 215 is transmitted to the signaling transfer node 130. In the same way a local subscriber profile 115 is transmitted from the HLR 110 of the visited network to the STP (steps 46 and 47). The two subscriber profiles are then combined to a combined subscriber profile 315 (step S48), the combined subscriber profile being transmitted to the VMSC in step S49.

The transmission of the combined subscriber profile is symbolized by step S50. In step S51 the result message is sent to the STP 130. In steps S52 and S53 the result message is forwarded to the HLR 210 and HLR 110, respectively, the location update result message being received from HLR 210 in step S54 and from HLR 110 in step S55. Finally, in step S56, the location update result is then transmitted to the VMSC 100.

The STP 130 in the visited network is adapted to behave as described below in more detail.

1 The STP 130 processes the MAP location update message for an inbound roaming subscriber, i.e. the IMSI belonging to a foreign PLMN, it checks whether this IMSI is marked as being associated with a local MSISDN. If this is the case, then the STP distributes the message over two domains, the HPLMN of the inbound roaming subscriber and the VPLMN (steps S42 and S43). The rationale here is that the combined profile or aggregated profile for the subscriber should be constructed comprising a combination of the HPLMN subscription data and the VPLMN subscription data, the latter being associated with a local MSISDN.

The sending of the MAP location update towards the HPLMN in step S42 occurs in a regular manner, namely using the IMSI as global title for SCCP (Signaling Connection Control Part) routing and applying a global title translation (GTT) value as specified for IMSI based routing. An STP in the HPLMN contains a mapping table for selecting the HLR associated with this IMSI. Thus, in step S42 the IMSI is used to first identify the network to which the roaming subscriber belongs, the message being sent to the home network from where it is transmitted further, by an STP in the home network to the HLR associated with this IMSI.

The sending of the MAP location update towards the HLR of the visited network, however, may also be based on global translation. The STP will, however, use a different global title translation, GTT value, specifically a GTT for SCCP routing based on a local MSISDN-HLR mapping table. The GTT value indicates to the STPs in the visited network that take care of the SCCP routing that they shall route the MAP message to the HLR with which this local MSISDN is associated.

2. The STP may, for sending the MAP location update messages, in steps S42 and S43, use its own address as message origination address, so as to ensure that the MAP insert subscriber data (ISD) messages resulting from the sending of the MAP location update messages traverse this STP.

3. The HLR in the home network returns a subscriber profile, the home profile carried in MAP ISD. The HLR 110 in the visited network will return a subscriber profile, the visited or local subscriber profile 115 also carried in MAP ISD. The IMSI of the subscriber was, at the time of signing up to the local MSISDN service, provisioned in the HLR 110, whereby this IMSI got associated with the local MSISDN that was assigned, as part of the signing up process to this subscriber.

4. STP 130 uses the MAP ISD messages to construct a combined subscriber profile 315. The STP then sends the combined profile towards the MSC as indicated in step S49. The MSC then has received a subscriber profile as normal, whereby the subscriber profile is adapted to contain (a) the regular subscription data received from the HLR 210 of the home network and (b) a set of VPLMN related subscription data received from HLR 110 in the visited network.

5. The STP 130 receives the MAP ISD result from the MSC and the STP sends the ISD result message to the respective HLRs (step S52 and S53).

6. The STP receives the MAP LU result from the respective HLRs; the STP sends a MAP LU result message to the MSC in step S56.

The combined subscriber profile 315 constitutes a combination of a regular GSM/3G profile and a VPLMN profile. FIG. 5 reflects, through ASN.1 (Abstract Syntax Notation 1) data type description, what additional data elements are conveyed in the MAP ISD from the STP to the MSC. The additional data elements are shown in an underlined way. As shown in FIG. 5 the enhancement to the data is adding a parameter, such as a VPLMN profile to the main level of the argument. Instead of conveying this information in a designated parameter on the main level of the argument, it may be conveyed in an instance of a parameter of type ExtensionContainer. The usage of ExtensionContainer for conveying proprietary information through MAP or other SS7 protocols is common methodology and does not require further explanation.

The data types IDSN-AddressString, Ext-SS-InfoList and VlrCamelSubscription Info are specified in MAP and are known by the person skilled in the art.

localMSISDN: This parameter contains the MSISDN that was allocated to the user at the time of signing up for the local MSISDN service. The MSC 100 uses this local MSISDN as user identification for communication activities such as voice calls and Short messaging.

localSupplementaryServices: This parameter contains a set of supplementary services, such as Call Forwarding—Busy, Call Forwarding—No reply, Call Forwarding—Not reachable, CLIP, CLIR, COLP and COLR.

localSMSC-Address: This parameter contains the address of the SMSC to which short messages shall be sent. It is known to the person skilled in the art that the SMSC Address is programmed in the terminal and does not form part of regular subscription data. In order to prevent that the subscriber has to change the SMSC Address in his/her terminal, the MSC receives an SMSC Address as part of the local subscription data.

localCAMELSubscriptionInfo: This parameter contains a set of CAMEL subscription data, to be used for e.g. prepaid charging for originating calls. The CAMEL subscription data may be restricted to O-CSI, to be used for the prepaid charging of originating calls.

The MAP ISD that is sent from HLR 110 in VPLMN to STP may comprise only the above-listed parameters; i.e. only the local subscription parameters need to be sent by the local HLR. Hence, all optional parameters in MAP ISD can be omitted, in the ISD from HLR 110 to STP. Mandatory parameters should, of course, be included, but may have a default value. The STP may ignore these parameters. The invention does not preclude the inclusion of additional parameters in the local subscription profile, such as bearerServiceList and teleserviceList.

The memory impact on the MSC caused by the local profile is deemed to be acceptable. Local profile information is sent to the MSC only for inbound roamers that subscribe to this service. The total additional data storage may be in the order of 100-150 Bytes per local profile.

It is understood that the enhanced STP that is adding the local profile data to the Insert Subscriber Data message, will do so only for MSCs that support the dual registration. The operator that offers the local profile service shall take care that the MSC in the network are adequately enhanced, so as to be able to receive and process the local profile parameters.

In the following it is explained how the roaming subscriber can select one of the two profile parts. In the embodiment described below a protocol is used by the mobile phone to communicate with a computer of a subscriber administration system of the visited mobile communications network. The indicated reference signs relate to the signs indicated in FIG. 2 and FIG. 4.

Once the subscriber is registered in the visited network 60 with double profile, i.e. home profile and visited profile, USSD (Unstructured Supplementary Service Data) can be used for selecting which profile shall be the active profile. The MSC 100 in the visited network 60 may offer local USSD service, as per standard. Local USSD service constitutes a USSD application that is executed by the MSC. A USSD code from the standardized Local USSD service code range shall be used hereto. In this manner, the user can conveniently switch between his local profile and his home profile.

In the following different traffic cases are discussed in more detail. First of all, an originating call from a local MSISDN is discussed.

When the roaming subscriber establishes a call when the local MSISDN is the active profile part, the MSC 100 applies call establishment as normal, however with the following differences:
- The MSC 100 uses the local MSISDN to identify the calling subscriber. Hence, it uses the local MSISDN to set the calling party number (CgPN) in ISUP IAM (Integrated Services User Part Initial Address Message) and CAP IDP (CAMEL Application Part Initial Detection Point), if applicable and to identify the subscriber in the mobile originating call (MOC) CDR (Call Detail Record).
- The MSC 100 uses the O-CSI (Originating CAMEL Subscription Information) from the local CAMEL subscription information if present to invoke a CAMEL service.
- The MSC uses the local supplementary service for CLIR and COLP.
- The MSC includes an indication in the MOC CDR that the call is established with the local MSISDN.

When an MSC 100 establishes an originating call, it is common for the MSC to base the call establishment process on the IMSI of the calling subscriber. For example, analysis of the dialed number is influenced by the IMSI. This feature is known as 'B-number origin' (BNO). BNO has the form of an index into the B-number analysis table in the MSC. B-number analysis for an inbound roaming subscriber can hence be different from B-number analysis for a home subscriber. In addition, B-number analysis of inbound roaming subscribers from different operators may differ, based on their respective IMSI's. When an inbound roaming subscriber establishes a call based on the local profile, it would be desirable to base the B-number analysis as per home subscribers, even considering that the subscriber's IMSI is from a foreign operator. The solution shall therefore include that when a call is established by inbound roaming subscriber based on local profile, the BNO shall be set to 'local'. Number analysis will now be done as for regular home subscribers.

Setting the BNO at beginning of call establishment forms part of a process call 'IMSI analysis'. IMSI analysis is applied when a subscriber attaches to the MSC. For the described case, namely call establishment by inbound roaming subscriber based on local profile, the MSC shall apply BNO='local', regardless of the BNO that resulted from the IMSI analysis at registration.

In the following a terminating call towards the local MSISDN is discussed.

A call that is established towards a local MSISDN is routed to the GMSC 150 of the VPLMN operator as normal, because the local MSISDN is part of the VPLMN operator's numbering plan. The GMSC contacts HLR 110 as normal. The HLR has a subscriber profile for this MSISDN. The HLR 110 has, in addition, marked the subscriber as registered in one of this operator's MSCs. So, HLR applies regular terminating call for this subscriber, including the invocation of terminating CAMEL service (T-CSI sent to GMSC, optionally preceded by the sending of MAP Provide Subscriber Info, PSI, to VMSC).

The MAP Provide roaming number (PRN) that the HLR 110 sends to VMSC 100, for obtaining an MSRN for establishing the call, contains an indication 'localProfile'. FIG. 6 shows the enhancement to the MAP Provide Roaming Number. The additional data elements are shown as underlined elements.

The MSC 100 will provide the MSRN (Mobile Station Roaming Number), as normal, and the call is established to the MSC as normal, for offering the call to the destination subscriber. The MSC 100 applies the following distinctive handling for this call, resulting from the presence of localProfile in MAP PRN:
- The MSC 100 uses the localMSISDN to identify the called subscriber. Hence, it uses localMSISDN to set the Connected Number (if requested) in ISUP Answer (ANM) and to identify the subscriber in the Mobile Terminating Call (MTC) CDR.
- The MSC 100 uses localSupplementaryServices for CLIP and COLR as well as for the Call forwarding services.
- The MSC 100 includes an indication in the MTC CDR that the call is received on local MSISDN.

In addition, the MSC 100 applies specific number presentation to signal to the called subscriber that the call is established towards his local MSISDN. The MSC may use a technology including the applying of designated prefix (e.g. *) in front of the CLI, to signal how the call was established.

Below an originating short message from the local MSISDN will be explained.

When the subscriber sends an SMS when the Local MSISDN is the active profile, the MSC 100 applies the following distinctive behavior:
- The MSC 100 uses the local MSISDN to set the Sending subscriber in the MAP MO-ForwardSM message.
- The MSC 100 replaces the SMSC Address that is used in the Submit Short Message command from the mobile device, by the SMSC Address from the local profile.
- The MSC 100 includes an indication in the Originating SMS CDR that the message is sent from local MSISDN.

The Short Message is then sent towards the SMSC as identified in the SMSC Address from the local profile. This SMSC, which will be an SMSC of the visited PLMN, is provisioned with the MSISDN allocated to this inbound roaming subscriber.

The handling of a terminating short message towards local MSISDN is as follows:

When a message is sent towards the local MSISDN, the SMSC acting on behalf of the sending party sends MAP Send Routing Info for SM (SRI-ForSM) to the VPLMN's HLR, as normal. The HLR could respond by providing IMSI and MSC address towards the SMSC and the Short Message could then be delivered directly to the MSC where the subscriber is registered. Instead, the HLR 110 applies the following distinctive behavior:

The HLR 110 applies 'Home routing' for the Short Message. Home routing implies that the SMS is force routed via an SMS Router in the home network of the destination party. In this case, 'home network' is the visited network, since the roaming subscriber is addressed on his local MSISDN. Home routing for SMS is a common technique, known to the person skilled in the art.

When the SMS has been routed towards the SMS Router in the visited network and the HLR receives the SRI-ForSM, the HLR 110 includes an indication 'local profile' in the SRI-ForSM Result. FIG. 7 shows the enhancement to the MAP SRI-ForSM Result with the enhancement being underlined.

The SMS Router will, in turn, include the same 'local profile' parameter in the MAP MT-ForwardSM message. FIG. 8 shows the enhancement to the MAP MT-ForwardSM.

When the MSC 100 in the visited network receives the MAP MT-ForwardSM message containing the local profile indication, it applies regular terminating message handling, with the following distinctive behavior:

The MSC 100 includes an indication in the Terminating SMS CDR that the message is sent towards local MSISDN.

When the SMS that is destined for the subscriber and that is directed towards the subscriber's local MSISDN, is submitted through an SMSC of the visited network operator, then forced home routing of SMS won't be needed. The HLR 110 of the VPLMN may in that case provide to the SMSC (i.e. its own SMSC) directly the localProfile parameter in the SRI-ForSM Result. The SMSC can then include it in the MAP MT-ForwardSM message.

The calling and messaging to or from the home MSISDN is processed by the MSC as normal.

This includes the establishing of an originating call when the home profile is active, the receiving of a call that is established towards the home MSISDN, the sending of a short message when the home profile is active and the receiving of a short message that is addressed towards the home MSISDN.

In the following, Service interaction is shortly discussed.

Service interaction may occur in cases as the subscriber engaged in a call that was established with the local profile and, during that call, receiving a call that was established towards the home MSISDN. Such interaction case can be supported by the solution, as an MSC 100 generally handles calls in these scenarios independently. In fact, call processing in the MSC 100 is largely identical for calls established based on local profile and calls established based on home profile.

Another feasible scenario is that the subscriber engaged in a call that was established with the local profile and, during that call, receives an SMS that was addressed towards the subscriber's home MSISDN. The process of SMS delivery is independent of the ongoing call, hence these processes would not interfere.

Call waiting (CW) and Call Hold (CH) shall be feasible for the local profile. However, to prevent unforeseen scenarios, the local profile shall not include Explicit Call Transfer (ECT) and Multi Party (MPTY). The usage of ECT or MPTY, when the active call or one of the held calls is established based on local profile, may result in a call connection comprising a mix of local profile call(s) and home profile call(s). Such scenario would lead to unforeseen charging cases and shall hence be prevented, by not including ECT or MPTY in the local profile.

In an embodiment of the invention, ECT or MPTY may be allowed for a local profile call, but only when all calls involved in the ECT or MPTY call are local profile calls.

In the following the charging is discussed.

Generally, when communication is established to or from the local MSISDN, the charging is handled by the visited network operator. The CDR that is generated by the MSC 100 for this communication contains the marking 'local MSISDN'. As a result, the charging gateway in the visited network, which collects the CDRs from the network, will not forward the CDR, converted to TAP (Transfer Account Procedure) file, to the Home PLMN. Instead, it will process the CDR locally.

It is further assumed that the charging is done through prepaid, for both calling and Messaging. Hence, the CDRs don't need further processing, but can be stored locally.

The subscriber can also actively select the part at the profile that shall be used for a communication activity.

It may occur that the subscriber's home MSISDN is the active profile, but he wishes to establish a call under his local MSISDN, or the other way around. DTAP facilitates the use of operator-specific supplementary service command codes that may be used during call establishment. For example:

*81*0031161249400

The digits *81* constitute a service code for the visited network operator. In this manner, the subscriber may, for example use the following service codes:

*81* to establish a call under his home profile, when the local profile is currently the active profile

*82* to establish a call under his local profile, when the home profile is currently the active profile The MSC 100 analyses these prefix digits, as part of the pre-number analysis.

Figure 9:
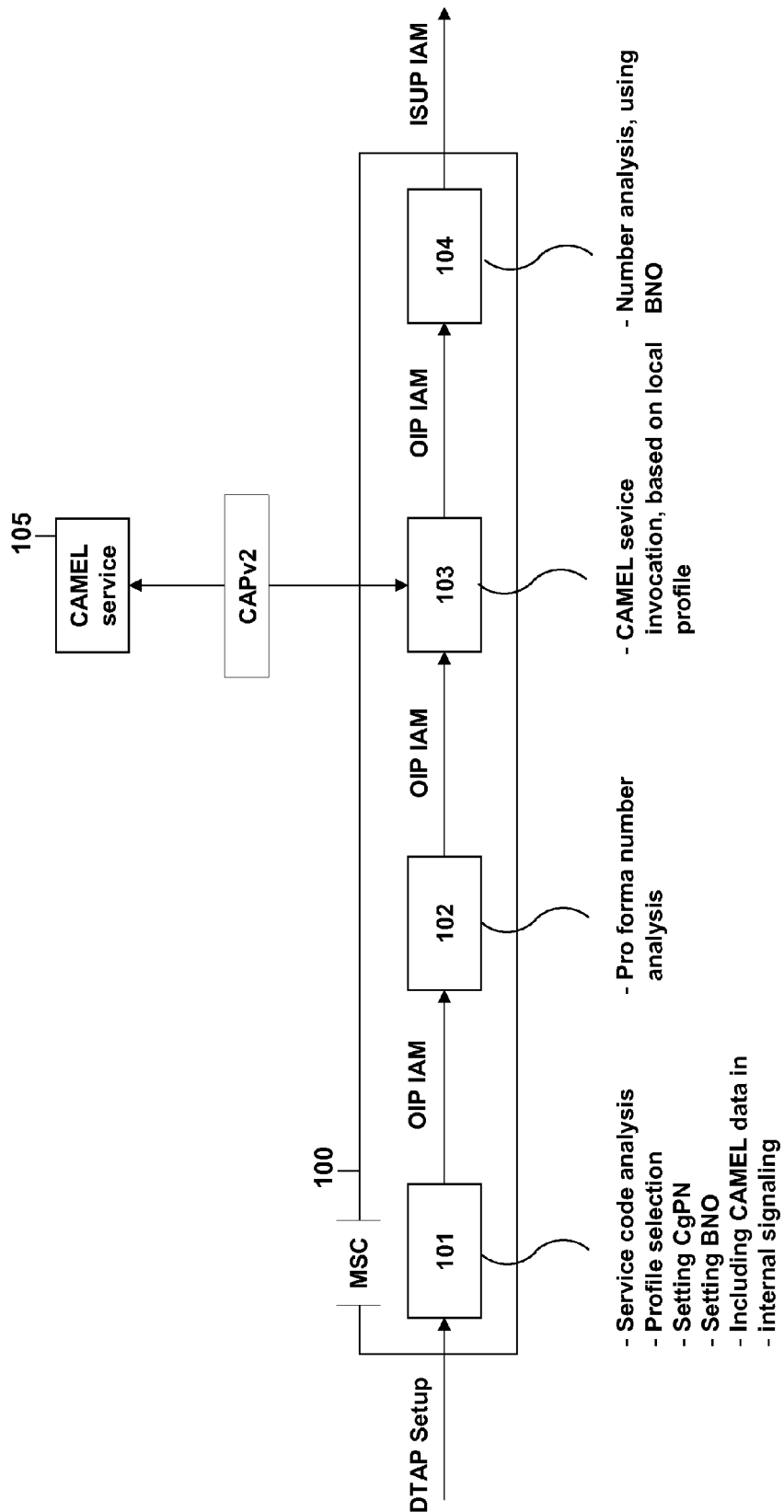
FIG. 9 is a block diagram illustrating a call establishment in a mobile switching center, MSC.

For the implementation in which the subscriber can actively select the part of the combined subscriber profile that should be used for activity is discussed with reference to FIG. 9. The operator-specific service code analysis may be carried out in module 101. Unit 101 is an access network interface module. It receives a DTAP (Direct Transfer Application Part) message from the mobile user entity, UE, over the radio access network. Module 101 determines from its subscriber data record contained in the VLR that the subscriber is registered with the combined profile. Module 101 will as a standard procedure, apply pre-number analysis to determine among others whether the dialed number contains a service selection code. This service selection code is a profile command identifying which part of the combined subscriber profile shall be used. If this service selection code or profile command such as *81* or *82* is detected and presuming the subscriber registered with dual profile, module 101 will set the profile for this call accordingly as mentioned above. If no service selection code such as *81* or *82* is detected and presuming the subscriber is registered with the combined profile, module 101 selects the active profile.

Module 101 sets the BNO, the calling party number and the CAMEL profile in accordance with the active profile. Further signaling internal in the MSC is based on the Internal ISUP Protocol (IIP) which is considered as an MSC-internal enhancement of ISUP. The call establishment message, IIP initial address message (IAM), is forwarded to traffic handling module 102. Since IIP IAM contains CAMEL profile, module 102 forwards the OPI IAM directly to Intelligent Network (IN) service interaction module 103 which is a service switching application module. Module 103 uses the CAMEL profile contained in the IIP IAM to trigger a CAMEL service 105. Since the call is established with the local profile, the CAMEL profile will contain the address of a Service Control Point (SCP) in the VPLMN. CAMEL service invocation occurs as per standard. After the CAMEL service has been invoked and the CAMEL service has instructed the MSC to continue call establishment, module 103 forwards the IIP IAM to the next module 104, a second traffic handling module which applies the B-number analysis in accordance with BNO as applicable for this call. The call is now established towards the desired destination, i.e. MSC 100 sends ISUP IAM towards the desired destination.

In the following it is explained how a B-number analysis is used for selecting the active part of the combined profile.

In an alternative embodiment, the selection of the profile for a call that is established by a subscriber with dual profile may be based on the dialed number. This method is explained through an example. An inbound subscriber has registered in a PLMN in Greece (country code 30) and is registered with dual profile.

When the subscriber dials a number starting with +30 or 0030, the call is considered a 'local call' and the local profile is selected.

For a call to any other number, the home profile is selected.

Hereto, the pre-number analysis in the access network interface module, as described above, is enhanced to base profile selection on the dialed number. When the profile for the call is selected, further call handling is as described, based on the profile for that call. The subscriber has in this case still the possibility to explicitly select a profile for the call, regardless of the destination of the call, namely through usage of *81* (home profile) or *82* (local profile).

For incoming calls and incoming messages, profile selection remains based on the public identifier that was used to address the subscriber. For Short Message sending, profile selection remains based on the active profile.

When a subscriber signs up for 'local MSISDN' of a particular visited country, provisioning needs to be done in the visited operator's network. The local MSISDN that is assigned to the foreign subscriber needs to be coupled with the subscriber's IMSI. The combination of IMSI and MSISDN forms the basis of the subscriber record in the HLR 110 of the visited network operator. The MSISDN is owned by the visited network operator and may hence already be provisioned in one of the operator's HLRs. The IMSI is strictly associated with the subscriber; it is contained in the SIM/USIM in the UICC. Hence, the IMSI becomes known to the visited network operator when the subscriber signs up for the service.

It is envisaged that providing the IMSI to the visited network operator's provisioning system can be done through the use of USSD in the visited network, as follows:

(i) The user signs up for the service, e.g. through a web portal. In this process, the user has to provide his MSISDN and the provisioning system allocates a local MSISDN.

(ii) When the subscriber has signed up to the service, the subscriber uses USSD to activate the service. The USSD service to use shall be a local USSD service, i.e. a USSD service that is processed by the MSC in the visited country. This can be accomplished through the use of a USSD code that forms part of the USSD code range that is standardized for use in the visited network. The USSD application in the MSC uses standard MAP signaling towards an external entity, the visited network's provisioning system in this case, to provide MSISDN and IMSI.

As a safety procedure, the subscriber receives a secure code during the signing up process and has to enter this secure code in the USSD command.

(iii) The provisioning system now has the information available to couple home MSISDN, local MSISDN and IMSI. The combination of local MSISDN and IMSI is now used to do the provisioning in the network.

The following provision actions are performed:

HLR 110: A subscriber profile is created in the HLR, comprising the local MSISDN and the IMSI. The profile shall be a standard, default subscriber profile, comprising a defined, limited set of services, including (non-exhaustive) Call forwarding (Busy, No-reply, Not-reachable), CAMEL prepaid (O-CSI, T-CSI), CLIP, CLIR (potentially also: COLP, COLR), Call hold and Call waiting.

STP 130: STPs in a GSM/3G network are generally provisioned with mapping between MSISDN and HLR, as well as mapping between IMSI and HLR. The MSISDN-HLR mapping is needed for routing MAP messages for which the routing is based on MSISDN, such SRI or SRI-ForSM. The IMSI-HLR mapping is needed for routing MAP messages for which the routing is based on IMSI, such as Location Update.

Hence, the STPs in the visited network are provisioned with above-described mapping from IMSI to HPLMN and mapping from local MSISDN to HLR in VPLMN.

SMSC: SMSC is provisioned with the local MSISDN, so it can process SMS's submitted by this subscriber, based on local MSISDN.

Charging system: Charging system is generally provisioned with the combination of IMSI and MSISDN, so it can do the online charging, when appropriate, and process CDRs that relate to calls/Messages established with the local MSISDN.

Voicemail: Voicemail system is provisioned with a voicemail box for the local MSISDN.

Once the provisioning is complete, registration into the visited network's HLR is needed. This can be accomplished as follows:

(i) The provisioning system issues a command to the MSC 100 to purge the subscriber profile.

(ii) The provisioning system issues a command to the MSC to re-initiate location update. The re-initiated location update will have the effect that the MAP Location Update is subject to special processing by the enhanced STP in the network, since the STP is provisioned with the local MSISDN and the IMSI. The STP can hence behave as described in connection with FIG. 4, to send a Location Update to both the Home PLMN HLR 210 and the VPLMN HLR 110.

The deregistration from visited PLMN may be carried out as follows:

When the subscriber performs a location update to another MSC, in the same visited PLMN, the MAP Location Update will be subject by STP processing, for sending the MAP LU to HLR. The MAP LU will, again, be sent to both HPLMN HLR 210 and VPLMN HLR 110, since the IMSI is still marked (provisioned) in the STP as 'tied to local MSISDN'. The subscriber will now get registered in the new MSC, including the combined subscription profile as described above in FIG. 4. The HLR sends, as per normal, a MAP message to the old MSC to purge the subscriber data. For this implementation, the MAP message coming from the VPLMN HLR 110 towards the MSC, to purge the subscriber data, may be ignored by the enhanced STP, since the subscriber data will already be purged by a MAP message from the HPLMN HLR 210. No need (and no possibility) to 'purge twice'.

When the subscriber moves to a location outside the VPLMN 60, the subscriber will be purged from the MSC, as normal. The subscriber will, in this case, no longer be registered in an MSC in the VPLMN 60. The enhanced STP receives the MAP message from HPLMN HLR 210 to purge the subscriber from MSC. Since the subscriber did not get registered in another MSC in the VPLMN, the enhanced STP sends a MAP message to the VPLMN HLR to indicate that the subscriber, i.e. the local MSISDN, is Detached.

As per the service agreement, the local MSISDN service of the foreign subscriber may remain active, even when the person is (temporarily) not registered in the visited network. When the foreign subscriber is not registered for a designated period of time, his local MSISDN service may expire and he will be deprovisioned from the various systems in the VPLMN.

CAMEL roaming agreement

Whereas the solution discussed above uses CAMEL service for prepaid charging of calls that are established based on the local profile, this does not stipulate that a roaming agreement exists between the HPLMN 50 and the VPLMN 60. The invocation of CAMEL service, for charging, in this scenario (calls establishment based on local profile) occurs based on CAMEL service trigger data present in the local profile. I.e. this CAMEL service triggering is not dependent on CAMEL service trigger data sent from HPLMN to VPLMN. The MSC 100 behaves as follows:

Registration
  Home profile, received by MSC from HLR 210 in HPLMN 50, may contain CAMEL service trigger data, conformant to CAMEL agreement between HPLMN and VPLMN;
  Local profile, received by MSC from HLR 110 in VPLMN 60, contains, in one embodiment, CAMEL service trigger data. The sending of CAMEL trigger data to the MSC, as part of the local profile, is not dependent on CAMEL agreement between HPLMN and VPLMN.

Call Establishment
  When a call is established based on home profile, CAMEL service is invoked, if CAMEL trigger data is present in the home profile and any applicable service trigger conditions are fulfilled;
  When a call is established based on local profile, CAMEL service is invoked based on the CAMEL trigger data present in the local profile.

The supplementary service management is described below.

When the subscriber applies supplementary service management with the DTAP command procedures as specified in 3GPP TS 24.010, the MSC shall apply the command in accordance with the active subscriber profile:

Home MSISDN is the active profile:
  Supplementary service commands that fall in the category of commands that are handled in the MSC 100, such as interrogation for conditional call forwarding, shall be handled in the MSC, as normal, using the supplementary service data as applicable for the home profile.
  Supplementary service commands that fall in the category of commands that are handled in the HLR, such as activating or de-activating call forwarding, shall be forwarded to the HLR 210 in HPLMN, as normal.

Local MSISDN is the active profile:
  Supplementary service commands that fall in the category of commands that are handled in the MSC 100, shall be handled in the MSC, using the supplementary service data as applicable for the local profile. The MSC responds, for example, with an indication that Call forwarding Busy, for calls destined to the local MSISDN, is active towards the local voicemail box.
  Supplementary service commands that fall in the category of commands that are handled in the HLR, shall be forwarded to the visited network HLR. The visited network HLR can handle the command, since it has a service profile for this MSISDN & IMSI.

The STP can determine from the MSISDN in the MAP messages sent towards HLR whether the message shall be sent towards the HPLMN HLR 210, as normal, or towards the visited network HLR.

A supplementary service command may result in the sending of a stand-alone Insert subscriber data (ISD) from the HLR that had received and processed the supplementary service command. The ISD traverses the enhanced STP in the visited network, as normal, towards the MSC 100. The enhanced STP shall ensure that updated call forwarding information, for example, from the visited network HLR is conveyed to the MSC as part of the localProfile.

Figure 10:
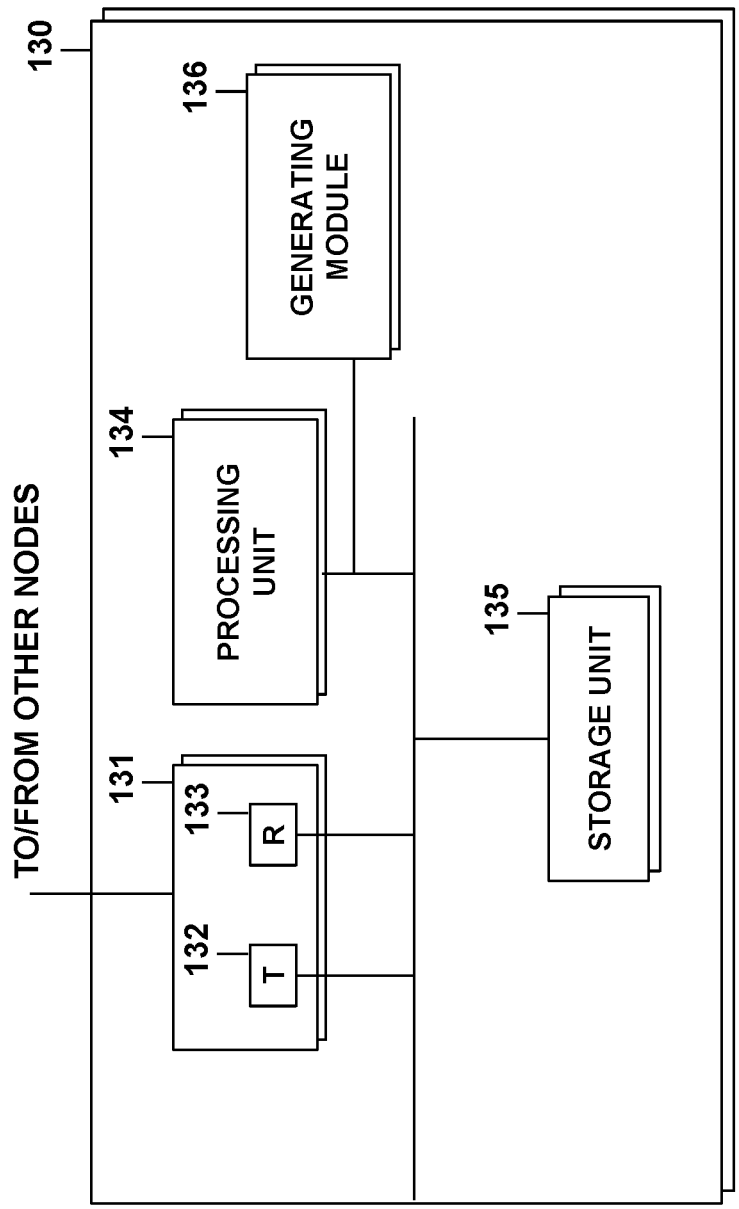
FIG. 10 is a block diagram illustrating a signaling transfer node.

FIG. 10 shows a schematic view of the signaling transfer point/signaling transfer node 130. The signaling transfer node 130 comprises an input/output unit 131 for a communication to other nodes or units in the network or outside the network. The communication is symbolized by a transmitter 132 configured to transmit data or messages to other entities, a receiver 133 symbolizing the capability to receive data or messages from other entities. A processing unit 134 may control the operating of the STP. The processing unit may comprise one or more processors. The processing unit 134 may inter alia generate the combined subscriber profile from the home subscriber profile and the local subscriber profile, may be responsible for the translation of the global identification number in such a way that the received location update message is transmitted to the local subscriber database and to the home subscriber database. In another embodiment the combined subscriber profile is generated in a generating module 136. The processing unit 134 is then configured to enable/initialize the generation of the combined profile by the generating module 136.

Furthermore, the processing unit 134 can check whether the indicator is set which indicates that the subscriber is a subscriber that has subscribed to the local subscriber profile. A storage unit 135 may be provided to store information or data received from other nodes.

Figure 11:
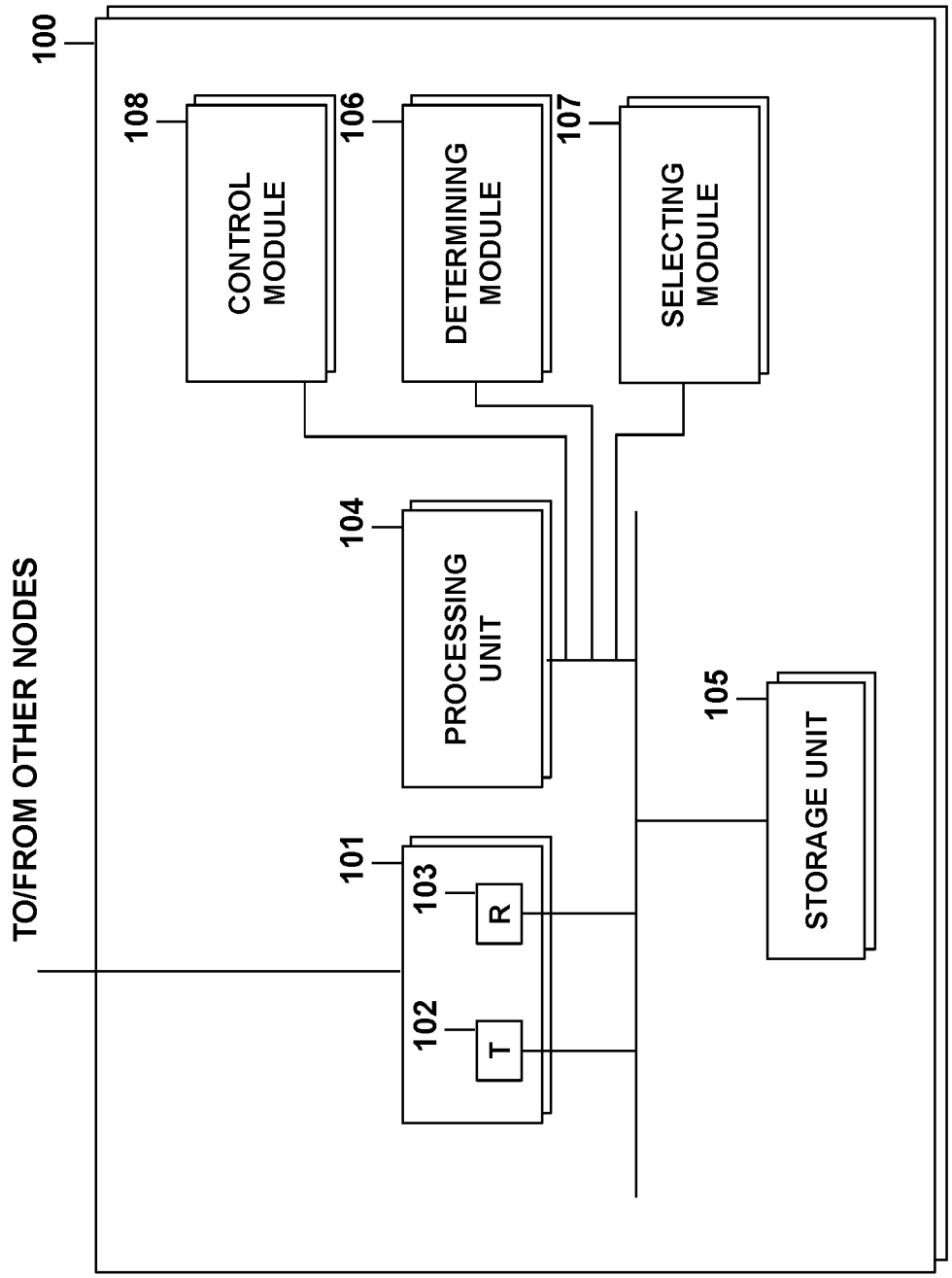
FIG. 11 is a block diagram illustrating a control node controlling a communication activity of the roaming user in the visited network.

FIG. 11 shows a schematic view of a control node/central node/mobile switching center 100. The MSC 100 comprises input/output unit 101 symbolizing the capability to communicate to entities outside the MSC, a transmitter 102 being provided for transmitting data or message to the outside, and receiver 103 to receive message or data from outside. A processing unit 104 controls MSC 100 so that the MSC 100 can operate as described above in more detail. A storage unit 105 may be provided to store any required information.

The processing unit 104 can determine which part of the profile shall be the active part, can select the determined part as active part, and can control the communication based on the active part. In another embodiment the processing unit can initialize the determination in determining module 106, the selecting of the determined part as active part by selecting module 107 and the controlling of the activity by control module 108.

It should be understood that STP 130 and the MSC 100 may comprise other functional units not shown in the figures. Furthermore, the different functional units may be incorporated in another separation of the units as shown and the units may be incorporated by hardware, software or a combination of hardware and software.

The above described invention helps to avoid that a subscriber has to buy a local SIM card, or to rent a second mobile phone. The subscriber can continue to use the contacts provided on the mobile phone. The subscriber can furthermore actively determine which profile part should be used for a call or SMS.

The method of the invention provides the advantage of a user friendly local communication service option for a roaming subscriber. Without the need for SIM swap, phone swap, multi-SIM or other methodology, the subscriber is reachable on her home MSISDN, as normal, but also on a local MSISDN. When the subscriber has selected the local profile as the active profile, outgoing calls and SMS's are established based on the local profile, which comprises (i) local MSISDN as calling (calls) originating (SMS) party number, (ii) charging by visited network operator. Calls that are established towards the subscriber's local MSISDN will be established based on the local profile, which includes, among others, forwarding to local voicemail (with local welcome announcement), when busy etc.

The subscriber may advantageously use the local MSISDN for business/private purposes whilst in the visited country, which may in many cases be preferred above using the home MSISDN, especially for communication for which the subscriber would want to present yourself as 'a local'. This does not only concern cost of the call, but also the phone number, namely a local number, that is used for communication through your local subscription.

At the same time, advantageously your home subscription is active and available as normal, meaning that you can call/SMS from or be called/SMS'd on your home MSISDN, for which your regular home subscription profile applies, such as call forwarding etc.

The invention claimed is:

1. A method, implemented by a network node, for signaling a mobility activity of a roaming subscriber in a visited mobile communications network, the roaming subscriber being a subscriber of a home mobile communications network, the method comprising:

transmitting a received location update message for the roaming subscriber to a home subscriber database, the home subscriber database being a subscriber database in the home mobile communications network;

transmitting the received location update message for the roaming subscriber to a local subscriber database, the local subscriber database being a subscriber database of the visited mobile communications network;

receiving a home subscriber profile for the roaming subscriber from the home subscriber database, the home subscriber profile containing subscriber related information of the roaming subscriber of the home mobile communications network;

receiving a local subscriber profile for the roaming subscriber from the local subscriber database, the local subscriber profile containing subscriber related information of the roaming subscriber of the visited mobile communications network;

generating a combined subscriber profile for the roaming subscriber, the combined subscriber profile being a combination of the home subscriber profile and the local subscriber profile;

transmitting the generated combined subscriber profile to a control node that controls a communication activity of the roaming subscriber in the visited mobile communications network.

2. The method of claim 1, wherein the method comprises determining the home mobile communications network, for transmitting the received location update message to the home subscriber database, the location update message being forwarded in the home mobile communications network to the home subscriber database, wherein a global identification number uniquely identifying the roaming subscriber in different mobile communications networks is used with a first translation mechanism to determine the home mobile communications network to which the received location update message shall be transmitted, and wherein, for transmitting the received location update message to the local subscriber database, a second translation mechanism different from the first translation mechanism is used to identify the local subscriber database to which the received location update message is to be transmitted.

3. The method of claim 1, further comprising determining, when receiving a location update message, whether an indicator is set, the indicator indicating that a local subscriber identification number belonging to the visited mobile communications network is assigned to the roaming subscriber by the visited mobile communications network, wherein the received location update message is transmitted to the local subscriber database and to the home subscriber database if the indicator is set, wherein the received location update message is transmitted only to the home subscriber database, and not to the local subscriber database, if the indicator is not set.

4. The method of claim 1, wherein the location update message is transmitted to the home subscriber database and to the local subscriber database using a message originating address of the network node allowing the network node to be identified, the network node being a signaling transfer node.

5. A method, implemented by a control node, for controlling a communication activity of a roaming subscriber in a visited mobile communications network, the roaming subscriber being a subscriber of a home mobile communications network, the method comprising:

receiving a combined subscriber profile from a signaling transfer node of the visited mobile communications network, the combined subscriber profile being a combination of a home subscriber profile and a local subscriber profile, the home subscriber profile containing subscriber related information of the roaming subscriber of the home mobile communications network, the local subscriber profile containing subscriber related information of the roaming subscriber of the visited mobile communications network;

storing the combined subscriber profile with an active profile part and a non-active profile part, the active profile part being one of the home subscriber profile and the local subscriber profile, the non-active part being the other of the home subscriber profile and the local subscriber profile;

determining, for the communication activity, which part in the combined subscriber profile shall be used for controlling the communication activity;

selecting the determined part as the active part of the contained subscriber profile; and controlling the communication activity of the roaming subscriber based on the active part of the combined subscriber profile.

6. The method of claim 5, wherein, when the communication activity is an activity originating at the roaming subscriber, the part of the combined subscriber profile that shall be used for controlling the communication activity is detected and the communication activity is controlled based on the detected part of the combined subscriber profile.

7. The method of claim 5, wherein, when the communication activity is an activity terminating at the roaming subscriber, it is determined whether a called party number belonging to the visited mobile communications network or belonging to the home mobile communications network is used to address the roaming subscriber, wherein the mobile communications network to which the called party number belongs is determined and the part of combined subscriber profile relating to the determined mobile communications network is detected and used to control the communication activity terminating at the roaming subscriber.

8. The method of claim 7, wherein the called party number used for the activity terminating at the roaming subscriber is indicated to the roaming subscriber.

9. The method of claim 5, wherein it is determined based on an input of the roaming subscriber which part in the combined subscriber profile shall be used for controlling the communication activity.

10. The method of claim 9, wherein the input contains a profile command which identifies which part of the combined subscriber profile shall be used for controlling the communication activity, wherein, when the profile command is detected, the part of the combined subscriber profile that shall be used for controlling the communication activity is selected based on the detected profile command.

11. The method of claim 9, wherein the input contains a dialed profile identification number when the communication activity is originating at the roaming subscriber, wherein the part of the combined subscriber profile that shall be used for the communication is selected based on the dialed profile identification number.

12. The method of claim 5, wherein, when the local subscriber profile is the active part of the combined subscriber profile and the communication activity is an activity originating at the roaming subscriber, a calling party number of the roaming subscriber belonging to the visited mobile communications network is used to identify the roaming subscriber.

13. The method of claim 12, wherein a B-number analysis for the originating activity is carried out in the same way as for subscribers of the visited mobile communications network.

14. The method of claim 5, wherein, when the communication activity is an activity terminating at the roaming subscriber and is directed to a local called party number, a called party number of the roaming subscriber belonging to the visited mobile communications network is used to identify the roaming subscriber to which the activity is directed.

15. The method of claim 14, further comprising the step of signaling to the roaming subscriber that the activity terminating at the roaming subscriber is directed to the local called party number.

16. The method of claim 1, wherein the local subscriber profile comprises at least one of the following data: a subscriber identification number used to identify the roaming subscriber, said subscriber identification number belonging to the visited mobile communications network, a set of basic services relating to the visited mobile communications network, a set of supplementary services relating to the visited mobile communications network, an address of a short-message-service center of the visited mobile communications network, CAMEL subscription data for the visited mobile communications network.

17. A network node configured to signal a mobility activity of a roaming subscriber in a visited mobile communications network, the roaming subscriber being a subscriber of a home mobile communications network, the network node comprising:
  a transmitter configured to transmit a received location update message for the roaming subscriber to a home subscriber database, the home subscriber database being the subscriber database in the home mobile communications network, and configured to transmit the received location update message for the roaming subscriber also to a local subscriber database, the local subscriber database being a subscriber database of the visited mobile communications network;
  a receiver configured to receive a home subscriber profile for the roaming subscriber, the home subscriber profile containing subscriber related information of the roaming subscriber of the home mobile communications network, and to receive a local subscriber profile for the roaming subscriber, the local subscriber profile containing subscriber related information of the roaming subscriber of the visited mobile communications network; and
  a processing unit configured to generate a combined subscriber profile for the roaming subscriber, the combined subscriber profile being a combination of the home subscriber profile and the local subscriber profile, wherein the processing unit is configured to initiate the transmission of the generated combined subscriber profile to a control node which controls a communication activity of the roaming subscriber in the visited mobile communications network.

18. A control node configured to control a communication activity of a roaming subscriber in a visited mobile communications network, the roaming subscriber being a subscriber of a home mobile communications network, the control unit comprising:
  a receiver configured to receive a combined subscriber profile from a network node of the visited mobile communications network, the combined subscriber profile being a combination of a home subscriber profile and a local subscriber profile, the home subscriber profile containing subscriber related information of the roaming subscriber of the home mobile communications network, the local subscriber profile containing subscriber related information of the roaming subscriber of the visited mobile communications network;
  a storage unit configured to store the combined subscriber profile with an active profile part and a non-active profile part, the active profile part being one of the home subscriber profile and the local subscriber profile, the non-active part being the other of the home subscriber profile and the local subscriber profile; and
  a processing unit configured to determine for the communication activity which part in the combined subscriber profile shall be used for controlling the communication activity, configured to select the determined part in the combined subscriber profile as the active part of the combined subscriber profile and to control the communication activity of the roaming subscriber based on the active part of the combined subscriber profile.

* * * * *